United States Patent
Suzuki et al.

(10) Patent No.: US 6,555,927 B1
(45) Date of Patent: Apr. 29, 2003

(54) VEHICULAR ENGINE STARTING CONTROL APPARATUS AND VEHICULAR ENGINE STARTING CONTROL METHOD

(75) Inventors: Naoto Suzuki, Fujinomiya (JP); Toshifumi Takaoka, Susono (JP); Takashi Suzuki, Susono (JP); Daimon Okada, Ikeda (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 84 days.

(21) Appl. No.: 09/694,007

(22) Filed: Oct. 23, 2000

(30) Foreign Application Priority Data

Nov. 19, 1999 (JP) .............................. 11-329891

(51) Int. Cl.$^7$ ................................. F02N 11/00
(52) U.S. Cl. ......................... 290/34; 290/40 C
(58) Field of Search ............... 290/34, 38 R, 290/40 R, 40 A, 40 C; 180/65.2; 318/140

(56) References Cited

U.S. PATENT DOCUMENTS

| | | | | |
|---|---|---|---|---|
| 4,493,303 A | * | 1/1985 | Thompson et al. ......... 123/352 |
| 5,063,513 A | * | 11/1991 | Shank et al. .......... 123/142.5 E |
| 5,934,395 A | | 8/1999 | Koide et al. ................ 180/65.2 |
| 6,060,981 A | * | 5/2000 | Landes ........................ 180/287 |
| 6,093,974 A | * | 7/2000 | Tabata et al. .............. 180/65.2 |
| 6,352,489 B1 | * | 3/2002 | Kuroda et al. ............. 180/65.2 |

FOREIGN PATENT DOCUMENTS

| | | |
|---|---|---|
| JP | 9-117012 | 5/1997 |
| JP | 9-170533 | 6/1997 |

* cited by examiner

Primary Examiner—Nicholas Ponomarenko
(74) Attorney, Agent, or Firm—Oliff & Berridge, PLC

(57) ABSTRACT

In a vehicle equipped with a motor generator and a starter, if an ignition key has been switched from OFF to ON, preferably an engine is started by using the starter. However, if the temperature T of the engine is high ($B \leq T$), the engine is started by the motor generator. When the engine is restarted after automatic stop thereof, preferably the engine is started by using the motor generator. However, if the temperature T of the engine is low ($T \leq A$), the engine is started by using the starter. The engine is started by suitably selecting between the starter and the motor generator, whereby it becomes possible to improve responsive characteristics and startability and abate oscillatory noise.

2 Claims, 4 Drawing Sheets

FIG. 2A

| IG<br>OFF → ON | ST |
|---|---|
| RESTARTING AFTER AUTOMATIC STOP OF ENGINE | MG |

FIG. 2B

| TEMPERATURE OF ENGINE (T) | |
|---|---|
| LOW | ST |
| HIGH | MG |

FIG. 2C

| TEMPERATURE OF ENGINE (T) | IG<br>OFF → ON |
|---|---|
| LOW | ST |
| HIGH | MG |

FIG. 2D

| TEMPERATURE OF ENGINE (T) | IG<br>OFF → ON | RESTARTING AFTER AUTOMATIC STOP OF ENGINE |
|---|---|---|
| T ≦ A (LOW) | ST | ST |
| A < T < B (INTERMEDIATE) | ST | MG |
| B ≦ T (HIGH) | MG | MG |

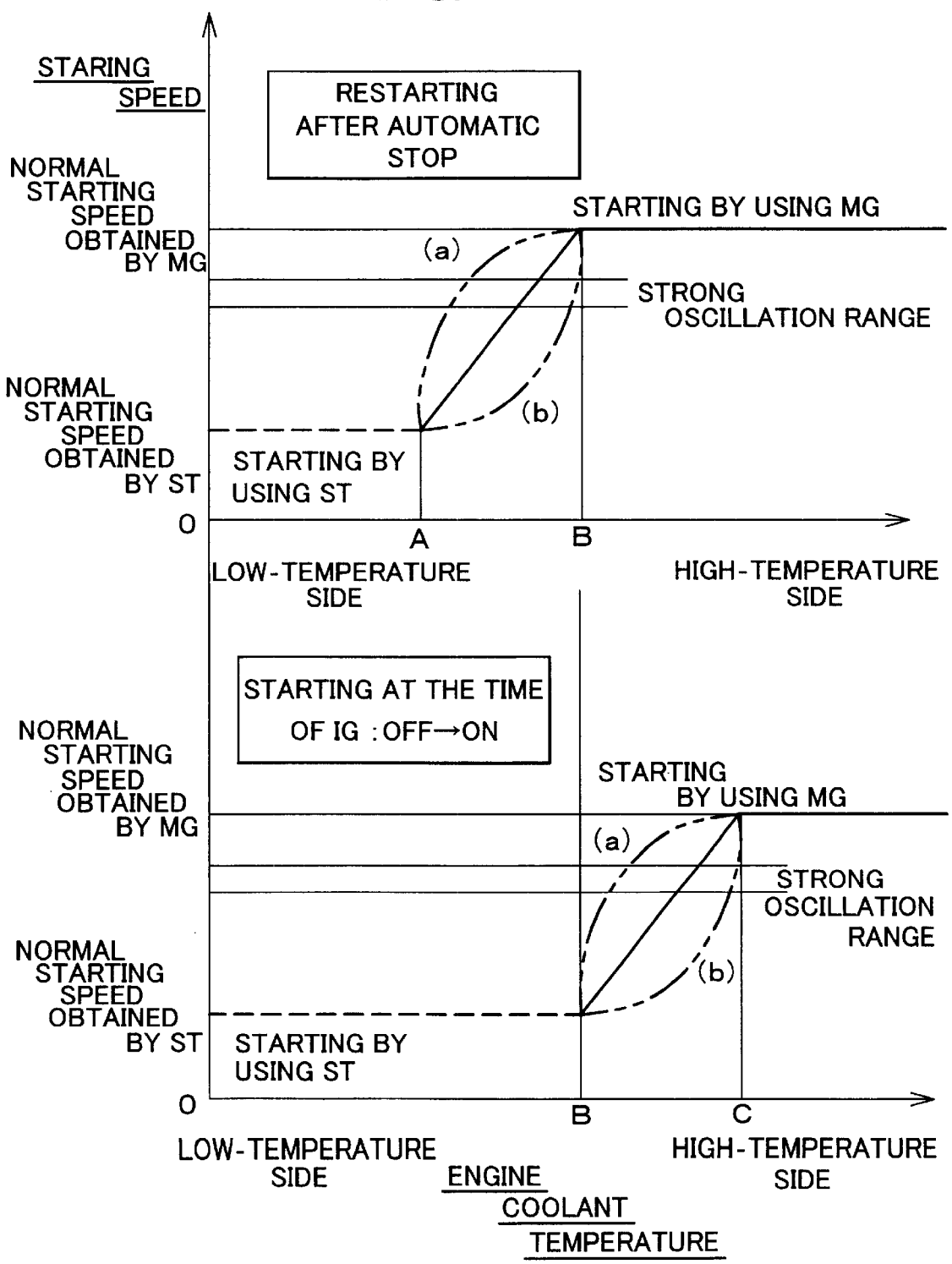

VEHICULAR ENGINE STARTING CONTROL APPARATUS AND VEHICULAR ENGINE STARTING CONTROL METHOD

The disclosure of Japanese Patent Application No. 11-329891 filed on Nov. 19, 1999, including the specification, drawings and abstract is incorporated herein by reference in its entirety.

BACKGROUND OF THE INVENTION

1. Field of the Invention

The invention relates to vehicular engine starting control apparatus and vehicular engine starting control methods for a vehicle having an engine and a motor generator as power sources.

2. Description of Related Art

Hybrid vehicles having an engine and a motor generator as power sources for driving the vehicle are known. For example, as disclosed in Japanese Laid-Open Patent Application No 9-170533 (which corresponds to U.S. Pat. No. 5,934,395), some vehicles of this type have an engine started by means of a motor generator and others have an engine started by a separate starter (a dedicated motor for starting the engine).

A hybrid vehicle performs an iterative operation of automatically stopping and restarting the engine (hereinafter referred to as "intermittent operation" for convenience of explanation). Thus, the engine is either started through operation by the vehicle driver (started by switching an ignition key from OFF to ON) or automatically restarted during intermittent operation. However, in the aforementioned vehicles, a suitable selection in terms of the characteristics of the starter and the motor generator has not always been made.

SUMMARY OF THE INVENTION

It is one object of the invention to provide a vehicular engine starting control apparatus for a vehicle equipped with both a starter and a motor generator wherein startability of the engine can be improved by starting the engine while suitably selecting between the starter and the motor generator.

In order to solve the aforementioned and/or other problems, according to a first aspect of the invention there is provided a vehicular engine starting control apparatus for a vehicle having an engine which outputs power to a drive shaft of the vehicle, a motor generator which inputs power to and outputs power from a power transmission path that extends from an output shaft the engine to the drive shaft, and a starter which is coupled to the output shaft of the engine. The vehicular starting control apparatus includes a controller that: (1) receives an initial engine starting command if an ignition key has been switched from OFF to ON; (2) receives an engine restarting command upon fulfillment of a predetermined restarting condition during automatic stop of the engine; (3) issues a command to start the engine by using the starter upon issuance of the initial engine starting command; and (4) issues a command to start the engine by using the motor generator upon issuance of the engine restarting command.

In general, the starter and the motor generator are intrinsically different in function. Although they are both electric motors, they are different in type and performance.

The starter (ST) can reliably start the engine under any circumstance (e.g., even in a frigid state). The starter is usually constructed of a DC motor and driven at a low speed and a large torque with a low voltage and large electric power. Thus, since the starter is capable of generating a large torque, the engine can be started reliably even at a low temperature. On the other hand, the starter has disadvantages such as large power consumption, inadequate responsive characteristics and strong oscillation.

The motor generator (MG) is used as an electric motor to assist or replace the engine when driving the vehicle, and is used as a generator to regenerate coasting energy during deceleration (which is used to charge a battery that supplies energy to the motor generator when it is used as an electric motor). Thus, because of mechanical characteristics of the motor generator, the torque that can be generated thereby is smaller in comparison with the starter. The motor generator is driven at a high speed and a low torque with a high voltage and small electric power. Thus, even when the engine is repeatedly stopped and automatically restarted irrespective of the driver's intention as in the case of intermittent operation, the motor generator makes it possible to start the engine without causing a sense of incongruity to the driver. However, the motor generator cannot generate a large torque and is thus unsuited for the starting operation at a low temperature, for example. Especially in a frigid state where the battery itself cannot function properly, the motor generator is disadvantageous in that it causes further deterioration of startability.

In the first aspect of the invention, the engine starting operation that is performed when the driver switches the ignition ON and the engine restarting operation that is automatically performed during intermittent operation are distinguished from each other. If the ignition key has been switched from OFF to ON, the engine is started by the starter. On the other hand, the engine is restarted by the motor generator while the vehicle is being driven (i.e., restarted during intermittent operation).

In many cases, the engine is initially started by switching the ignition key ON when the temperature is low. Because this operation is performed by the starter, the engine starting operation can be performed with high reliability. Because this starting operation is based on the driver's intention, oscillation or noise can be tolerated to some extent. Such oscillation or noise sometimes helps the driver confirm that the engine definitely has been started. Further, since the engine is restarted by means of the motor generator during intermittent operation, the engine restarting operation can be performed tranquilly and smoothly (without causing a sense of incongruity to the driver). Therefore, it is possible to sufficiently exploit advantages of using the starter and the motor generator while counterbalancing their disadvantages.

According to a second aspect of the invention, there is provided a vehicular engine starting control apparatus for a vehicle having an engine which outputs power to a drive shaft of the vehicle, a motor generator which inputs power to and outputs power from a power transmission path that extends from an output shaft of the engine to the drive shaft, and a starter which is coupled to the output shaft of the engine. The vehicular engine starting control apparatus includes a temperature detector which detects a temperature of the engine, and a controller which: (1) issues a command to start the engine with the starter if the detected temperature of the engine is equal to or lower than a predetermined temperature; and (2) issues a command to start the engine with the motor generator if the detected temperature of the engine is higher than the predetermined temperature.

In the second aspect of the invention, it is determined whether the engine is to be started with the starter or with the motor generator depending on a detected temperature of the engine. That is, since the engine cannot be started smoothly when the temperature of the engine is low, the engine is started with the starter. Thus, while sacrificing tranquility to some extent, startability of the engine is ensured with high reliability. On the other hand, since the engine can be started smoothly when the temperature of the engine is high, the engine is started with the motor generator. Thus, startability of the engine is ensured with tranquility, smoothness and good responsive characteristics.

In the case of the second aspect of the invention, when starting the engine, the starter or the motor generator is selected depending on a temperature of the engine, without regard to whether the engine is started through operation of the ignition key or the engine is restarted during intermittent operation. This aspect of the invention is especially useful when the engine is started during intermittent operation. That is, when the engine is started during intermittent operation, use of the motor generator usually causes no problem. For example, if the vehicle has been stationary for a long time in a cold period with the engine being stopped, the engine becomes low in temperature. Thus, it may be more or less difficult to start the engine with the motor generator. Intermittent operation (automatic stop and restarting of the engine) is performed under various circumstances irrespective of the driver's intention. Therefore, such a situation in which the engine cannot be started smoothly during intermittent operation is undesirable.

In this respect, according to the second aspect of the invention, if the temperature of the engine lowers, the starting operation with the motor generator is automatically switched to the starting operation with the starter. Hence, good startability of the engine can be ensured irrespective of a temperature of the engine.

For example, if the predetermined temperature is set equal to or lower than a ordinary temperature, the engine can be started by the motor generator in place of the starter when the vehicle is used at the ordinary temperature. Therefore, it is possible to start the engine more tranquilly in comparison with the starting operation with the starter.

Although the temperature of the engine can be measured through installation of a dedicated temperature sensor, a temperature of an engine coolant, namely, a value detected by a coolant temperature sensor can be used instead. It is also possible to substitute an outside air temperature or a temperature of intake air for the temperature of the engine. Further, a temperature of an on-vehicle battery can also be utilized.

According to a third aspect of the invention, there is provided a vehicular engine starting control apparatus for a vehicle having an engine which outputs power to a drive shaft of the vehicle, a motor generator which inputs power to and outputs power from a power transmission path that extends from an output shaft of the engine to the drive shaft, and a starter which is coupled to the output shaft of the engine. The vehicular engine starting control apparatus includes a temperature detector which detects a temperature of the engine, and a controller that: (1) receives an initial starting command if an ignition key has been switched from OFF to ON; (2) issues a command to start the engine with the starter if the detected temperature of the engine is lower than a predetermined temperature upon issuance of the initial engine starting command; and (3) issues to start the engine with the motor generator if the detected temperature of the engine is higher than the predetermined temperature upon issuance of the initial engine starting command.

That is, also in this case, when starting the engine the starter or the motor generator is selected depending on a temperature of the engine. However, this starting operation is performed only if the ignition switch has been switched ON.

If the ignition key has been switched ON, it can be regarded that the starting operation has been performed based on the driver's intention. Thus, there is no need to give careful consideration to noise or oscillation. However, under a circumstance where the engine can be started with the motor generator, the motor generator is selected to start the engine, for it becomes possible to ensure more tranquility and better responsive characteristics. Thus, for example, the engine can be started at an ordinary temperature tranquilly and smoothly.

When starting the engine with the motor generator, the controller in the second and third aspects of the invention may be designed to set a starting speed to a lower speed in accordance with a fall in temperature of the engine.

In general, when the engine is started with the starter, the starting speed of the engine is usually equal to approximately 200 to 300 rpm. On the other hand, when the engine is started with the motor generator, the starting speed of the engine is set to approximately 800 to 1000 rpm. In an engine speed range above 800 rpm, oscillation of the vehicle tends to be strong. Thus, by instantaneously raising the engine speed to a speed exceeding the oscillation range, oscillation of the vehicle can be prevented. Consequently, it becomes possible to start the engine tranquilly.

As described above, in the case where the engine starting operation is selectively performed either by the starter or by the motor generator depending on the temperature of the engine, there is a great difference between a starting speed obtained by the starter and a starting speed obtained by the motor generator. Thus, if the temperature exceeds a certain temperature (a predetermined temperature), the starting speed for starting the engine jumps abruptly. This may cause a sense of incongruity to the driver.

For the purpose of minimizing such a sense of incongruity, the control is performed such that the starting speed obtained by the motor generator approaches the speed obtained by the starter (on the low-speed side). This not only serves to eliminate a sense of incongruity but also reduces the burden on the motor generator resulting from a rise in engine speed by reducing the starting speed obtained by the motor generator when the temperature is low and causing the engine to rotate autonomously at an early stage. That is, when the temperature is low, it is burdensome to raise the engine speed to 800 to 1000 rpm with the motor generator, because of a deterioration of performance of the battery and an increase in engine friction. Hence, if the engine speed has risen to a relatively low speed, the motor generator ends its role as a starter. That is, while neglecting oscillation to some extent, an attempt is made to reduce power consumption.

In this case, the relation between engine coolant temperature and starting speed obtained by the motor generator may be changed linearly. However, with a view to avoiding to the utmost an engine oscillation band that exists around 800 rpm, the characteristic curve for determining the relation therebetween may be realized as a convex curve or a concave curve. It is also possible to adopt a characteristic curve with a fall so that the oscillation range can be skipped (as will later be described).

Aspects of the invention are not limited to a control apparatus for a hybrid vehicle as described above. For example, other aspects of the invention include a hybrid vehicle or a hybrid system, and a method of controlling a hybrid vehicle or a hybrid system.

BRIEF DESCRIPTION OF THE DRAWINGS

The foregoing and further objects, features and advantages of the invention will become apparent from the following description of preferred embodiments with reference to the accompanying drawings, in which:

FIGS. 2A to 2D are explanatory views consisting of charts showing the contents of control performed by control apparatus in accordance with first through fourth embodiments of the invention;

FIG. 4 is a characteristic diagram showing a relation between temperature and starting engine speed in the fourth embodiment of the invention.

DETAILED DESCRIPTION OF PREFERRED EMBODIMENTS

Hereinafter, embodiments of the invention will be described in detail with reference to the drawings.

Figure 1:
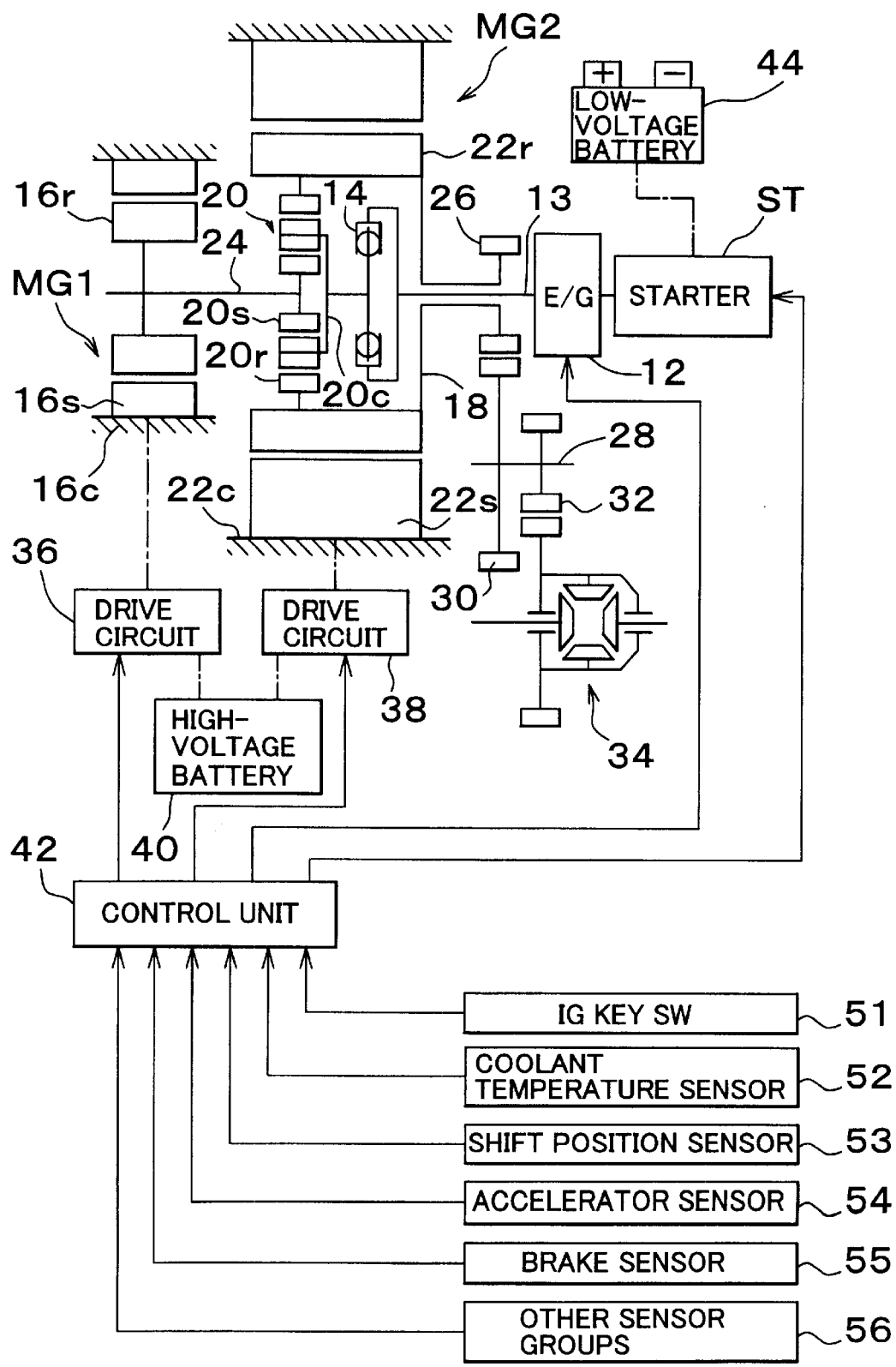
FIG. 1 is a block diagram showing the overall structure of a power transmission system of a vehicle to which the invention is applied.

FIG. 1 is block diagram schematically showing a power transmission system for a vehicle to which an engine starting control apparatus in accordance with the invention is applied. This vehicle has an engine 12 that outputs power by using gasoline as fuel, two motor generators MG1, MG2, and a starter ST serving as a dedicated motor for starting the engine 12. A planetary-gear-type distribution mechanism 20 is connected to an output shaft 13 of the engine 12 through a spring-type damper device 14 which absorbs rotational fluctuation of the engine 12. The starter ST is coupled to the output shaft 13 of the engine 12 on the other side. The distribution mechanism 20 mechanically distributes an output of the engine 12 to the side of the first motor generator MG1 and the second motor generator MG2. The second motor generator MG2 is coupled to an output member 18. The engine 12, the damper device 14, the distribution mechanism 20 and the first motor generator MG1 are coaxially disposed in the axial direction. The second motor generator MG2 is concentrically disposed on the side of outer peripheries of the distribution mechanism 20 and the damper device 14.

The motor generators MG1, MG2 are constructed as synchronous motor generators. Rotors 16r, 22r and stators 16s, 22s are disposed on outer peripheral surfaces of the motor generators MG1, MG2 respectively. The rotors 16r, 22r each have a plurality of permanent magnets. Three-phase coils forming a revolving magnetic field are wound around the stators 16s, 22s. The stators 16s, 22s are formed by laminating thin non-oriented electromagnetic steel plates and are fixed to cases 16c, 22c respectively. The motor generators MG1, MG2 operate as electric motors for rotationally driving the rotors 16r, 22r respectively, through the interaction of a magnetic field created by the permanent magnets on the rotors 16r, 22r and a revolving magnetic field created by the three-phase coils on the stators 16s, 22s. Through the aforementioned interaction, the motor generators MG1, MG2 also operate as generators for generating an electromotive force at both ends of the three-phase coils on the stators 16s, 22s respectively.

The first motor generator MG1 and the second motor generator MG2 are electrically connected to a high-voltage (e.g. 288 V) battery (an accumulator) 40 through drive circuits 36, 38 respectively. The motor generators MG1, MG2 are switched among a rotational drive state, a charging state and a no-load state. In the rotational drive state, the motor generators are supplied with electric energy from the high-voltage battery 40 and are rotationally driven at a predetermined torque. In the charging state, the motor generators function as generators by means of a torque for regenerative braking (electric braking of the motor generators themselves) and supply the high-voltage battery 40 with electric energy. In the no-load state, the motor generators permit free rotation of a motor shaft 24 and the rotor 22r. The drive circuits 36, 38 are controlled by a control unit (controller) 42. The engine 12 is controlled by the control unit 42. As a result, an operating state of the engine 12, including its speed, torque and the like, is controlled.

The distribution mechanism 20 is a single-pinion-type planetary gear and has three rotational elements. These rotational elements are a sun gear 20s coupled to the motor shaft 24 of the first motor generator MG1, a carrier 20c coupled to the damper device 14, and a ring gear 20r coupled to the rotor 22r of the second motor generator MG2.

The output member 18 is integrally secured to the rotor 22r of the second motor generator MG2 and is coupled to the ring gear 20r of the distribution mechanism 20 through the rotor 22r. The output member 18 is provided with an output gear 26. A bevel-gear-type differential 34 is rotated in a decelerating manner through a large gear 30 and a small gear 32 on a drive shaft 28, whereby power is distributed to left and right driven wheels (not shown) of the vehicle.

The starter ST designed as the dedicated starting motor is connected to the output shaft 13 of the engine 12. Therefore, the starter ST can rotationally drive the engine 12 without utilizing the distribution mechanism 20. The starter ST is operated by being supplied with electric power from a low-voltage (e.g., 12 V) battery (an accumulator) 44, which is identical to a battery installed in a general engine-driven vehicle. The low-voltage battery 44 has an external connection terminal. When the amount of electric charge in the low-voltage battery 44 is insufficient, it is possible to easily supply electric power to the low-voltage battery 44 from another general engine-driven vehicle through a booster (jumper) cable or the like. The starter ST operates in response to a command from the control unit 42.

The control unit 42 includes a microcomputer having a CPU, a RAM, a ROM and the like. For example, by performing signal processing in accordance with a preset program, the control unit 42 realizes:

(a) a motor running state wherein the vehicle travels using only the second motor generator MG2 as a power source, with the first motor generator MG1 being in a non-load state and the second motor generator MG2 being rotationally driven;

(b) a charging running state wherein the vehicle travels using only the engine 12 as a power source and charges the high-voltage battery 40 with the first motor generator MG1, with the first motor generator MG1 functioning as a generator and the second motor generator MG2 being in a non-load state;

(c) an engine-motor running state wherein the vehicle travels using the engine 12 and the second motor generator MG2 as power sources and charges the high-voltage battery 40 by means of the first motor generator MG1, which functions as a generator;

(d) regenerative braking control wherein the vehicle is braked in a regenerative manner, with the second motor generator MG2 functioning as a generator; and (e) charging control wherein the high-voltage battery 40 is charged exclusively by the first motor generator MG1, with the first motor generator MG1 functioning as a generator in a stopped state of the vehicle and the engine 12 being in operation.

The control unit 42 is also capable of performing engine starting control and intermittent operation control. In engine starting control, the engine is started when the driver turns an ignition switch 51 on. In intermittent operation control, the engine is automatically stopped upon fulfillment of a predetermined stopping condition, and the engine that has automatically been stopped is restarted upon fulfillment of a predetermined restarting condition.

Various signals required to perform automatic stopping control, that is, signals from the ignition switch 51, a coolant temperature sensor 52 for detecting a temperature of coolant for the engine, a switch (not shown) for an automatic stopping mode (an intermittent operation mode) of the engine, a shift position sensor 53, an accelerator sensor 54, a brake sensor 55 and the like, and signals from other sensor groups 56 are input to the control unit 42.

If the ignition switch 51 has been switched from OFF to ON, the control unit 42 issues an initial engine starting command and starts the engine 12.

Upon fulfillment of a predetermined engine stopping condition with an intermittent operation mode signal being on, the control unit 42 outputs a signal for cutting the supply of fuel to the engine 12 and automatically stops the engine.

Conditions for automatically stopping the engine in the intermittent operation mode include:

(a) that the foot-operated brake has been depressed;

(b) that the vehicle speed is equal to zero;

(c) that the accelerator has been released; and (d) that the battery has accumulated a sufficient amount of electric charges SOC.

Upon fulfillment of all of the above four conditions, automatic stopping of the engine is permitted.

Upon fulfillment of a predetermined engine restarting condition in a state where the engine 12 automatically has been stopped, the control unit 42 issues an engine restarting command and restarts the engine 12. For example, the engine restarting condition can be that at least one of the aforementioned engine stopping conditions becomes unfulfilled.

The engine 12 is started according to two different methods. That is, the engine 12 is started by the motor generators according to one of the methods, and by the starter according to the other method.

In starting the engine with the motor generators, the first motor generator MG1 is rotationally driven, whereby the engine 12 is rotated through the distribution mechanism 20. In this case, if the first motor generator MG1 is rotationally driven in the positive direction with rotation of the ring gear 20r of the distribution mechanism 20 being prevented due to a certain condition, the engine 12 is rotationally driven in the positive direction (cranked) at a speed corresponding to a gear ratio of the distribution mechanism 20. At the same time, engine starting control (firing) such as fuel injection and ignition is performed, whereby the engine 12 is started.

In starting the engine with the starter, the engine 12 is rotationally driven by the starter ST with the first motor generator MG1 being maintained in a non-load state (a free state). While the engine 12 is rotationally driven, engine starting control (firing) such as fuel injection is performed. Thereby the engine 12 is started.

As described above, the engine can be started either by the first motor generator MG1 (hereinafter referred to simply as "the motor generator MG") or by the starter ST.

In the invention, the engine is started by one of the motor generator MG or the starter ST depending on circumstances.

Hereinafter, contents of engine starting control in accordance with embodiments of the invention will be described.

FIG. 2A to FIG. 2D show the contents of the respective embodiments using charts.

In the first embodiment, as shown in FIG. 2A, if the ignition switch 51 has been switched from OFF to ON (hereinafter referred to simply as "IG: OFF→ON"), that is, if the driver has performed operation for starting the engine 12, the control unit 42 issues an initial engine starting command for the engine 12 and starts the engine 12 using the starter ST. Upon fulfillment of a predetermined engine restarting condition during automatic stop of the engine, the control unit 42 issues an engine restarting command and starts the engine 12 using the motor generator MG.

In the first embodiment, the initial starting operation of the engine is performed by the starter ST at the time of IG: OFF→ON. Thus, even at a low temperature where the engine 12 cannot be started smoothly, the engine 12 can be started with high reliability. Also, since the engine is restarted by the motor generator MG during intermittent operation, the engine can be started tranquilly and smoothly with good response, without causing a sense of incongruity to the driver.

In the second embodiment, as shown in FIG. 2B, the motor generator MG or the starter ST is selected to start the engine 12, depending on a detected temperature T of the engine. That is, if the detected temperature of the engine 12 is lower than a predetermined temperature, the control unit 42 starts the engine 12 using the starter ST. If the detected temperature of the engine 12 has exceeded the predetermined temperature, the control unit 42 starts the engine 12 using the motor generator MG.

In the second embodiment, the engine starting operation is performed using the starter ST at a low temperature where the engine cannot be started smoothly, and by using the motor generator MG at a high temperature where the engine can be started smoothly. Thus, it is possible to ensure high reliability in starting the engine at a low temperature, and to ensure tranquility and smoothness in starting the engine at a high temperature.

In the third embodiment, as shown in FIG. 2C, the selection according to a detected temperature of the engine 12 as in the second embodiment is made only at the time of IG: OFF→ON.

In the third embodiment, when the engine is initially started at the time of IG: OFF→ON, the engine starting operation is not always performed by the starter ST. Under a good condition (e.g., at a high temperature where the engine can be started smoothly), the engine starting operation is performed by the motor generator MG. Thus, for example, the engine starting operation at an ordinary temperature can be performed tranquilly and smoothly.

As shown in FIG. 2D, the aforementioned first through third embodiments are all taken into account in the fourth embodiment. The engine starting operation is performed differently roughly depending on whether the engine is started at the time of IG: OFF→ON or the engine is restarted after automatic stop thereof. Furthermore, in each case, the engine starting operation is performed differently depending on a detected temperature T of the engine.

That is, in the case where the engine is started at the time of IG: OFF→ON, the engine starting operation is performed as follows. If the temperature T of the engine is lower than a predetermined temperature B (T<B), the control unit 42 starts the engine 12 using the starter ST. If the temperature T of the engine is equal to or higher than the predetermined temperature B (B≦T), the control unit 42 starts the engine 12 using the motor generator MG.

Further, in the case where the engine is restarted after automatic stop thereof, the engine starting operation is performed as follows. If the temperature T of the engine is equal to or lower than a predetermined temperature A (T≦A), the control unit 42 starts the engine 12 using the starter ST. If the temperature T of the engine 12 is higher than the predetermined temperature A (A<T), the control unit 42 starts the engine 12 using the motor generator MG.

In the fourth embodiment, if the ignition switch has been switched from OFF to ON, the starter ST is used in principle to start the engine. Thereby high reliability is ensured in starting the engine. However, under a good condition, that is, when the temperature T of the engine is high (B≦T), it is considered possible to start the engine 12 easily using the motor generator MG. Hence, the engine starting operation is performed by the motor generator MG, whereby it becomes possible to ensure tranquility and smoothness in starting the engine.

When the engine is restarted after automatic stop thereof, the motor generator MG is used in principle to start the engine 12. Thereby it becomes possible to ensure tranquility and smoothness in starting the engine. If the temperature T of the engine is low (T≦A), the engine 12 is started using the starter ST to ensure high reliability in starting the engine.

In this manner, whether the engine is started at the time of IG: OFF→ON or restarted after automatic stop thereof, the conditions of the temperature of the engine are taken into account. Therefore, it is possible to sufficiently exploit advantages of both the cases while counterbalancing their disadvantages.

Figure 3:
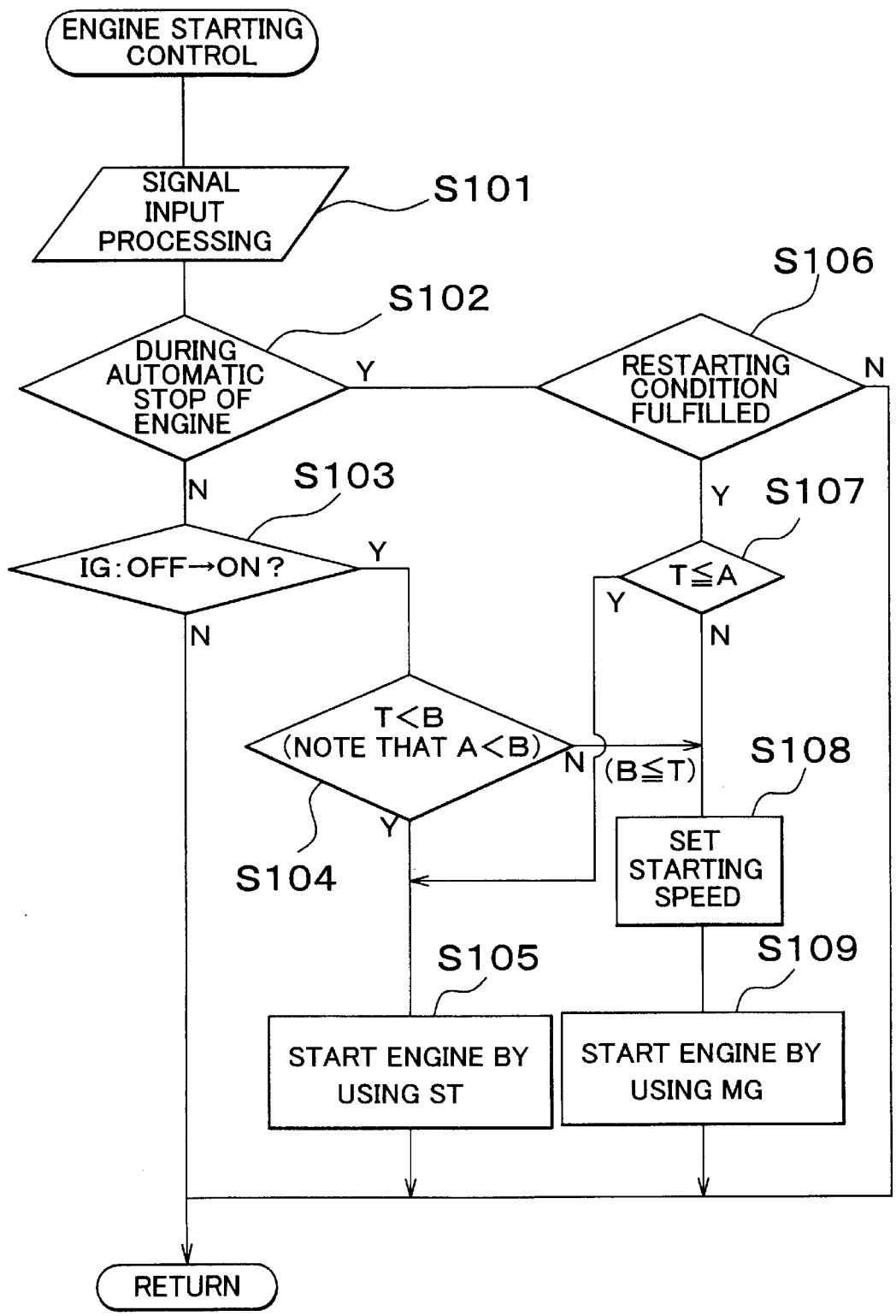
FIG. 3 is a flowchart showing procedures performed by the fourth embodiment of the invention.

Next, the contents of a fifth embodiment into which the fourth embodiment has been developed will be described with reference to the flowchart shown in FIG. 3. An engine starting control routine shown in FIG. 3 is executed when the engine 12 is stopped.

When this routine processing is started, signal input processings from various sensors and the like are performed in STEP S101. Then, it is determined in STEP S102 whether or not the engine 12 has automatically been stopped through intermittent operation control. If the engine 12 has not been automatically stopped, that is, if the engine has been stopped by the driver's intention, the operation proceeds to STEP S103. It is determined in STEP S103 whether or not the ignition switch 51 has been switched from OFF to ON (IG: OFF→ON). If the result in STEP S103 is negative, the operation exits from the present routine.

In the case of IG: OFF→ON, that is, if the ignition key switch 51 has been switched from OFF to ON by the driver, the operation proceeds to STEP S104 where it is determined whether the temperature T of the engine is lower than a predetermined temperature B (T<B). If the result in STEP S104 is affirmative, that is, if the temperature is low, the operation proceeds to STEP S105 where a command is issued to start the engine 12 by using the starter ST. Then, the operation exits the present routine.

If the temperature T of the engine is equal to or higher than a predetermined temperature B (B≦T), the result in STEP S104 is negative. Thus, the operation proceeds to STEP S108 where a starting speed (which will later be described) in starting the engine by using the motor generator MG is set. In the subsequent STEP S109, a command is issued to start the engine by using the motor generator MG. Then, the operation exits the present routine. At this moment, data on the starting speed that has been set in STEP S108 are also added.

If the engine 12 has been automatically stopped through intermittent operation control, the result in STEP S102 is affirmative. Then, the operation proceeds to STEP S106 where it is determined whether or not the engine restarting condition has been fulfilled. If the engine restarting condition has not been fulfilled, the operation exits the present routine.

If the engine restarting condition has been fulfilled, the operation proceeds from STEP S106 to STEP S107. It is determined in STEP S107 whether or not the temperature T of the engine is equal to or lower than a predetermined temperature A (A<B) (T≦A). If the result in STEP S107 is affirmative, that is, if the temperature is low, the operation proceeds to STEP S105 where the engine is started by using the starter ST. If the result in STEP S107 is negative, that is, if the temperature is high, the operation proceeds to STEP S108 and S109. In STEP S108 and S109, the engine is started by using the motor generator MG.

Next, a method of determining a starting speed corresponding to the temperature T of the engine in the aforementioned STEP S108 will be described.

As in the second through fourth embodiments, in the case where the engine starting operation is selectively performed either by the starter ST or by the motor generator MG depending on the temperature T of the engine, there is a great difference between a starting speed of the starter ST (usually approximately 200 to 300 rpm) and a starting speed of the motor generator MG (usually approximately 800 to 100 rpm). Thus, if the temperature exceeds a certain temperature (the predetermined temperature A or B), the starting speed for starting the engine jumps abruptly. This may cause a sense of incongruity to the driver.

Thus, for the purpose of minimizing such a sense of incongruity, a characteristic diagram shown in FIG. 4 is used to bridge the gap between the starting speed obtained by the motor generator MG and the speed (on the side of a low speed) obtained by the starter ST. The characteristic diagram shown in FIG. 4 shows a relation between engine coolant temperature (which corresponds to the temperature T of the engine) and starting speed. The upper part of FIG. 4 shows a characteristic curve when the engine is restarted after automatic stop thereof during intermittent operation control, whereas the lower part of FIG. 4 shows a characteristic curve when the engine is started at the time of IG: OFF→ON.

In the case where the engine is restarted after automatic stop thereof during intermittent operation control, the engine is started by using the starter ST if the engine coolant temperature is equal to or lower than a predetermined temperature A, and by using the motor generator MG if the engine coolant temperature is higher than the predetermined temperature A. Thus, in an engine starting range for the motor generator MG, if the engine coolant temperature is equal to or higher than a predetermined temperature B, the normal starting speed of the motor generator MG is used. On the other hand, in the engine starting range for the motor generator MG, if the engine coolant temperature is between the predetermined temperature A and the predetermined temperature B, the starting speed is linearly changed so as to approach the starting speed obtained by the starter ST in accordance with a decrease in engine coolant temperature.

In the case where the engine is started at the time of IG: OFF→ON, the engine is started by using the starter ST if the engine coolant temperature is equal to or lower than a predetermined temperature B, and the engine is started by using the motor generator MG if the engine coolant temperature is higher than the predetermined temperature B.

Thus, in an engine starting range for the motor generator MG, if the engine coolant temperature is higher than a predetermined temperature C (C>B), the normal starting speed obtained by the motor generator MG is used. On the other hand, in the engine starting range for the motor generator MG, if the engine coolant temperature is between the predetermined temperature B and the predetermined temperature C, the starting speed is linearly changed so as to approach the starting speed obtained by the starter ST in accordance with a decrease in engine coolant temperature.

Thus, it is possible not only to eliminate a sense of incongruity caused by the gap between the engine starting operation performed by the starter ST and the engine starting operation performed by the motor generator MG but also to reduce a starting speed of the motor generator MG when the temperature is low, so that the burden on the motor generator MG caused by a rise in engine speed is alleviated and so that the engine 12 is autonomously rotated at an early stage. That is, when the temperature is low, it is burdensome to raise the engine speed to 800 to 1000 rpm by using the motor generator MG, because of a deterioration of performance of the battery 40 and an increase in engine friction. Hence, even if the engine speed has risen to a relatively low speed, the engine 12 is ignited.

In this case, as described above, the relation between engine coolant temperature and starting speed obtained by the motor generator MG may be changed linearly. However, with a view to avoiding to the utmost an engine oscillation band that exists around 800 rpm (a strong oscillation range shown in FIG. 4), the characteristic curve for determining the relation therebetween may be realized as a convex curve (a) or a concave curve (b). It is also possible to adopt a characteristic curve that skips the oscillation range. Thus, it is possible to eliminate the aforementioned sense of incongruity while maintaining tranquility.

As has been described herein, the invention makes it possible to start the engine by suitably selecting the starter and the motor generator, improve responsive characteristics and startability, and abate oscillatory noise.

In the illustrated embodiment, the controller 42 is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. On the contrary, the invention is intended to cover various modifications and equivalent arrangements. In addition, while the various elements of the invention are shown in various combinations and configurations which are exemplary, other combinations and configurations, including more, less or only a single element, are also within the spirit and scope of the invention.

What is claimed is:

1. A vehicular engine starting control apparatus for a vehicle having an engine which outputs power to a drive shaft of the vehicle, a motor-generator which inputs power to and outputs power from a power transmission path that extends from an output shaft of the engine to the drive shaft, and a starter which is coupled to the output shaft of the engine, the control apparatus comprising:

a controller which: (1) receives an initial engine starting command if an ignition key has been switched from OFF to ON; (2) receives an engine restarting command upon fulfillment of a predetermined restarting condition during automatic stoppage of the engine; (3) issues a command to start the engine by using the starter upon issuance of the initial engine starting command; and (4) issues a command to start the engine by using the motor-generator upon issuance of the engine restarting command.

2. A vehicular engine starting control method for a vehicle having an engine which outputs power to a drive shaft of the vehicle, a motor-generator which inputs power to and outputs power from a power transmission path that extends from an output shaft of the engine to the drive shaft, and a starter which is coupled to the output shaft of the engine, the method comprising:

determining whether or not an ignition key has been switched from OFF to ON;

determining whether or not a predetermined restarting condition has been fulfilled during an automatic stoppage of the engine; and starting the engine by using the starter if the ignition key has been switched from OFF to ON, and by using the motor-generator if the predetermined restarting condition has been fulfilled during the automatic stoppage of the engine.

\* \* \* \* \*